Aug. 25, 1970     J. R. BONNEFOY ET AL     3,525,145
METHOD OF PRODUCING WIRE GUIDES FOR A MACHINE FOR SAWING
SAMPLES OF BRITTLE MATERIALS
Original Filed Dec. 27, 1966

INVENTORS
JEAN R. BONNEFOY
BERTRAND DREYFUS

Kemon, Palmer & Estabrook
ATTORNEYS

United States Patent Office 3,525,145
Patented Aug. 25, 1970

3,525,145
METHOD OF PRODUCING WIRE GUIDES FOR A MACHINE FOR SAWING SAMPLES OF BRITTLE MATERIALS
Jean Roger Bonnefoy, Montrouge, and Bertrand Alain Dreyfus, Sevres, France, assignors, by mesne assignments, to Photocircuits Corporation, Glen Cove, N.Y., a corporation of New York
Original application Dec. 27, 1966, Ser. No. 604,810. Divided and this application June 13, 1969, Ser. No. 833,904
Claims priority, application France, Oct. 5, 1966, 78,797
Int. Cl. B23p 13/04
U.S. Cl. 29—558                                          2 Claims

ABSTRACT OF THE DISCLOSURE

Multi-groove wire-guides for use in a machine for sawing samples of brittle materials by abrading such samples with an array of metal wires pressed against said samples while driven in an alternating motion and in an abrasive medium, are made with grooves the radially outer portions of the walls of which are substantially perpendicular to the axes of the wire-guides. Such grooves are machined with a comb-like tool, the teeth of which have the negative profile of the grooves and are, at least partly, machined on the sawing machine itself.

---

This application is a division of our copending application Ser. No. 604,810 filed Dec. 27, 1966.

The present invention is concerned with the sawing of samples of brittle materials, especially crystalline materials such as quartz, ceramics and simple or complex crystals of any kind including the crystals of semi-conductive materials previously doped or not and previously or not assembled to metal contact layers.

The invention relates to sawing machine for the above-defined materials which act by rubbing said material samples with an array of metal wires against which they are placed while driven in an alternating lateral motion within an abrasive medium. In order to substantially avoid the worn out of the array, it has been provided to constitute such an array from a single wire which is several times wound over wire-guides having multiple grooves, the said wire being fed from a single spool magazine and being drawn to a final receiving spool under the control of a beam-arrangement. Such an arrangement provides a continuous renewal of the wire of the array.

Further, in accordance with U.S. Pat. 3,155,087 of Bertrand Alain Dreyfus patented Nov. 3, 1964, in a machine of the above kind wherein a single wire array is submitted to an alternating motion while said wire is continuously translating from a feeder to a receiver spool, the receiver spool is driven permanently by a constant torque motor supplied with electrical current for freely running at a higher speed than the actual speed it is reduced by the traction of the wire, and the feeder spool is mounted on the shaft of a small slow rotation motor acting as a brake and regulator of the feed of said wire to said array.

In such machines, the alternating lateral motion of said single wire array is obtained from actuation of one at least of the multiple groove wire-guides, notwithstanding the actual means used for ensuring the continuous renewal of the wire in said array. The wire, maintained under a constant strain or stretch, lays in the bottom of each groove of said wire-guides within which it passes. It has been conventional to provide such grooves with a simple geometry, for instance with a triangular cross-section. The machining of the wire-guides is made on a revolving lathe with a tool which may be named a "comb" i.e. a rectilinear member wherein teeth have been cut, for instance with a diamond, said teeth each having a cross-section identical to the cross-section of the groove it must cut in the wire-guide blank.

The abrasive medium is made from a mixture of an abrasive powder, such for instance as silicon carbide, within machine oil. During operation of the machine, said mixture is carried away from the sawing place from the alternating motion of the wire array and progressively fills the grooves of the lateral wire-guides up to a point when the wire is pressed out of the groove or grooves. The operation must be stopped, the wire reinstated within the grooves after they have been cleaned. Not only this causes a loss of time but once the operation of the machine is resumed, there appears a discontinuity in the walls of the grooves machined in the material sample so that the products resulting from the machining are unsatisfactory and to reject, the sample having actually been ruined from such an occurrence of the wire being pulled out of one or more grooves of its wire-guides. On the other part, it is not feasible to reduce the amount of the abrasive mixture to such an extent that such a drawback became less frequent since applicants have noticed that a certain relatively high percentage of the abrasive powder in the mixture must be preserved for obtaining a satisfactory surface condition of the sawed products. Further and in an apparent fashion, the sawing time is related to such an abrasive powder rate in the mixture, said sawing time is the more shorter the more abrasive powder is present in the mixture.

According to a feature of the invention, the wire guides of a sawing machine of the above kind are provided with their grooves so shaped on part of their depth from their periphery as to present wall portions which are substantially perpendicular to the axis of the wire-guide.

According to a further feature of the invention, the "comb" tool with which such grooves are machined in said wire-guides is made from the two steps: in the first one, said comb is conventionally machined with a simple cross-section shape of its teeth as a triangular one and thereafter, in a second step the grooves between said teeth are notched perpendicularly to the greater lateral dimension of the comb from sawing such notches on the sawing machine proper. Preferably the notching is made with the sawing machine equipped with conventional wire-guides which have been machined from the comb tool after the first mentioned step.

These and further features will be described in detail with reference to the accompanying drawings, wherein.

Figure 1:
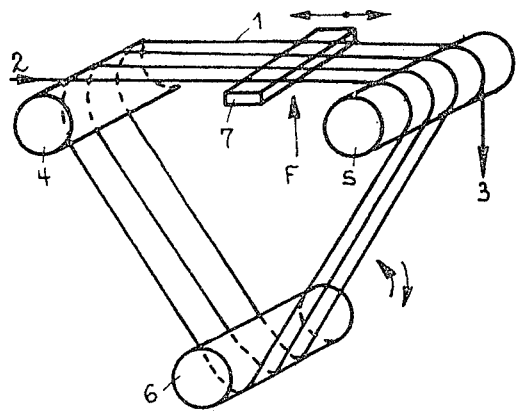
FIG. 1 shows a schematic view of that part of a wire array sawing machine concerned by the invention.

From the example of embodiment shown in the drawings any modification within the scope of the invention will be obvious for any engineer.

The wire array of FIG. 1, the number of turns is shown reduced for the sake of clarity, is made from a single wire passing over three wire-guides 4, 5 and 6, from an input 2 to an exit 3 so as to be continuously renewed at the sawing place whereat a sample 7 is shown urged against the array with a "load" or pressure F. One at least of the three wire-guides is driven in an alternating motion and consequently the array 1 reciprocates between the wire-guides 4 and 5. It must be understood that an abrasive mixture is permanently fed over the wire array and the sample throughout the sawing operation. The remaining part of the machine is not shown, being for instance such as described in the above referred patent.

Figure 3:
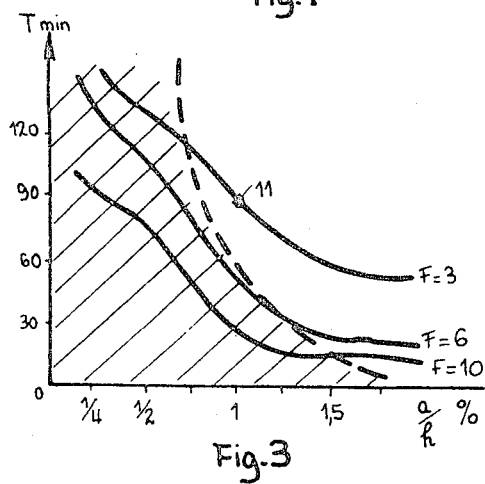
FIG. 3 shows a graph to be used in the explanation of the invention.

With a wire made of tungsten, for instance, the abrasive mixture will contain silicon carbide powder. In normal operation of the sawing machine, a relatively high pressure must be applied at F in order to reduce the length T of the sawing time whilst preserving a satisfactory surface condition of the faces of the products cut from the sample 7. Simultaneously, it is imperative to provide a relatively high proportion of the abrasive powder in the mixture. Illustratively, FIG. 3 shows a graph disclosing three curves for three values of F respectively equal to thrice, sixth and ten times a unit load (of an arbitrary value obtained by preliminary checks of the machine). Each of said curves shows the variation of T, length of the sawing operation for a sample of constant characteristics, plotted against the ratio $a/h$ in percentages of the abrasive powder in the machine oil of the mixture. These curves were made for a sample consisting of a rod of the glass commercially known as "Pyrex," of 13 mm. in diameter. The unit load was 195 gr. and the wire 1 was submitted to a constant stretch of 450 gr. For other materials similar curves were obtained without discrepancies from those shown in FIG. 3 from the qualitative point of view. The hatched-line region indicates combinations of time lengths, loads and ratios resulting in unsatisfactory operation and results. It is apparent that, for restricting the length of an operation to a lower value than one-half of an hour for higher load rates F, to a lower value than one hour for lower load rates, the ratio $a/h$ must be higher than 1.5.

Figure 2:
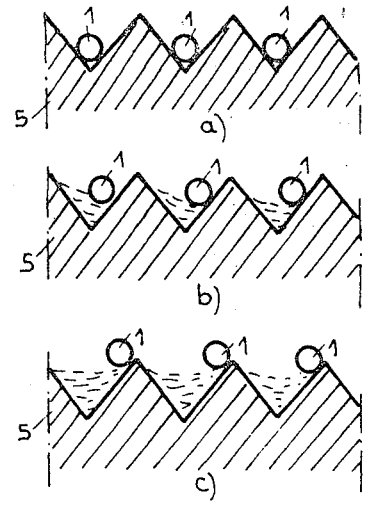
FIG. 2 shows sketches explaining how the defect to amend occurs in a conventional machine of this kind.

The abrasive material is carried by the wire array when reciprocating in motion across the span between the wave-guides 4 and 5 so that said abrasive mixture reaches the bottoms of the grooves and partly sticks within said grooves. As shown in FIG. 2, it is conventional to have wire-guides with grooves of triangular cross-section. When the operation is initiated, view (a) of FIG. 2, the wire rests in the bottom of the groove; as the operation proceeds, the abrasive mixture progressively fills the groove, and consequently the wire is progressively raised from the bottom of the groove, see view (b) of FIG. 2 together with a concomitant excentering of the wire with respect to the vertical axial plane of the groove, due to the translation of the wire for its continuous renewal. Finally, view (c) of FIG. 2, the deposit of the abrasive material is such that the wire escapes the groove. Whether the wire then breaks or not, the normal operation of the machine is stopped anyway. Not only an important loss of time results but once the repair is made and the operation initiated anew, the sawing does not start with conditions which are strictly identical to the preceding ones. The cuts in the sample do not continue the preceding ones with a sufficient identity as the work is one of great accuracy (the diameter of the wire is, for instance, of the order of one tenth of a millimetre). It results that most often the sample is lost and the products cut therefrom to be rejected as their faces are no more sufficiently smooth.

The wire-guides may be either made in a hard plastic material or made of a metal or metal alloy such as bronze. Usually they are machined with a special tool made as a comb on a turret-lathe or the like. Conventionally too the teeth of such a tool are obtained from a diamond cutting operation.

Figure 4:
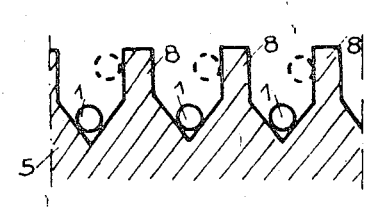
FIG. 4 shows a partial cross-section view of a wire-guide according to the invention.

For avoiding the above defined default, it is provided to shape the grooves of the wire-guides with, further to guiding channels proper of a conventional cross-section such for instance as a triangular one, or trapeze or oval one, appropriate for such a guidance, with upraised portions of their walls constituting arresting walls against the escape of the wire, such for instance as shown at 8 in FIG. 4. With such a shape of grooves, when the wire 1 is repelled out of the guiding channel of the groove, as shown in interrputed line, it abuts against the wall 8 instead of escaping the groove. Such an arrangement enables a satisfactory operation without such a default as described as lengthy as more than one hour with a rate $a/h$ satisfactory for the surface condition of the products from the sawing of the samples. Actually, said arrangement enables the best adaptation of the operative conditions for a sought result, it being a minimum length of time with an abrasive mixture of optimum efficiency and resulting in products having a high degree of surface conditions of their cut faces.

Figure 5:
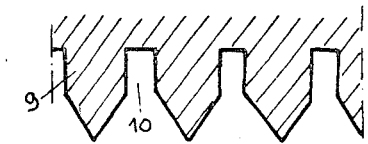
FIG. 5 shows a partial cross-section view of a comb tool for manufacturing the wire-guide of FIG. 4.

Such wire-guides as shown in FIG. 4 or with equivalent shapes of grooves must be machined with a comb tool the profile of the teeth of which is such as shown in FIG. 5 or a similar shape. This shape or any equivalent one is of course quite difficult to obtain with conventional machining, such for instance from a diamond cutting.

Figure 6:
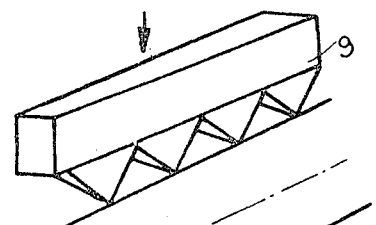
FIG. 6 shows a conventional comb tool when machining a wire-guide.
Figure 8:
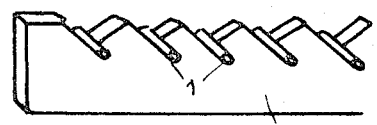
FIG. 8 shows a partial view of the comb tool of FIG. 6 mounted on the sawing machine as a sample to saw therewith.
Figures 7, 9:
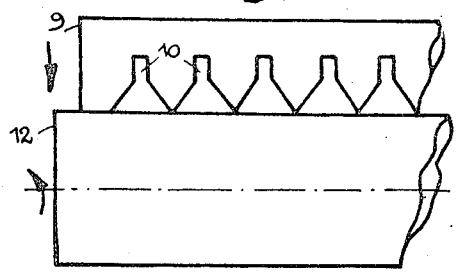
FIG. 7 shows a partial profile view of the wire-guide made with such a tool.
FIG. 9 shows a partial view of the machining of a wire-guide with the tool resulting from the operation shown in FIG. 8.

It is consequently further provided in the invention to use the sawing machine itself for preparing the comb tool with which the final wire-guides will be made, according to the following process:

A conventional comb tool is prepared from a diamond cutting with, for instance, triangular grooves, as shown at 9 and with such tool, three wire-guides are made which are mounted in the sawing machine in lieu of the three wire-guides 4, 5 and 6 of FIG. 1. These operations are shown in FIGS. 6 and 7, but the last one. Then the comb tool 9 is substituted to the sample 7 of FIG. 1, or better say, the comb tool 9 is mounted as a sample to cut. The wires of the array are well adapted to apply to the bottoms of the teeth of said comb piece since the wire-guides have been machined with said tool itself. The sawing is made at a relatively low speed, with a low value of the load F and a minimum quantity of the abrasive mixture, for instance in the conditions defined by point 11 of FIG. 3 on the curve $F=3$, with the $a/h$ ratio substantially equal to 1. The length of time of such operation is without importance since it is not a matter of production but of manufacturing of a tool. The sawing cuts notches in the bottoms of the teeth of the comb and is stopped when the required depth of such notches is reached. The result is a comb tool of the shape shown in FIG. 9 where said tool is shown for machining a wire-guide, the blank of which is shown at 12 in said FIG. 9. Three wire-guides are made and substituted on the sawing machine to the previous ones. As such wire-guides then have grooves as shown in FIG. 4, the default of operation of the sawing machine is consequently eliminated. Illustratively the comb tool may be made of hard carbide steel alloy.

We claim:

1. Method of producing wire-guides for a machine for sawing samples of brittle materials, said wire-guides each having a plurality of grooves and each groove being shaped with walls which are substantially perpendicular to the axis of the wire-guide on part of the depth of the groove from its periphery, comprising the steps of:

(a) machining a comb-shaped tool having teeth of equal length and uniformly tapered cross-section;

(b) cutting slots of substantially constant cross-section in the bottoms of the grooves in said comb-shaped tool between each tooth; and
(c) machining grooves of constant cross-section and uniformly tapered bottom portions in cylindrical wire-guide blanks using said comb-shaped tool as a cutting tool on a revolving lathe.

2. Method of producing wire-guides for a machine for sawing samples of brittle materials, said wire-guides each having a plurality of grooves and each groove being shaped with walls which are substantially perpendicular to the axis of the wire-guide on part of the depth of the groove from its periphery, comprising the steps of:
(a) machining a comb-shaped tool having teeth of uniformly tapered cross-section;
(b) machining grooves in wire-guide blanks on a revolving lathe with said comb-shaped tool;
(c) mounting the thus machined wire-guides on a machine for sawing samples of brittle materials;
(d) placing said comb-shaped tool as a sample in said sawing machine and cutting thereby slots of substantially constant cross-section in the bottoms of the grooves between the teeth of said comb-shaped tool; and
(e) machining grooves of constant cross-section and uniformly tapered bottom portions in final wire-guide blanks with said comb-shaped tool on a revolving lathe.

References Cited
UNITED STATES PATENTS

| | | | |
|---|---|---|---|
| 361,573 | 4/1887 | Baville | 74—230.5 X |
| 1,949,515 | 3/1934 | Norton | 29—558 |

FOREIGN PATENTS

| | | |
|---|---|---|
| 741,617 | 12/1955 | Great Britain. |
| 771,622 | 4/1957 | Great Britain. |

JOHN F. CAMPBELL, Primary Examiner

V. A. DI PALMA, Assistant Examiner